United States Patent

[11] 3,592,252

[72] Inventor Jean Francis Olagnier
  Ermont, France
[21] Appl. No. 803,586
[22] Filed Mar. 3, 1969
[45] Patented July 13, 1971
[73] Assignee Pneumatiques, Caoutchouc Manufacture Et
  Plastiques Kleber-Colombes
  Colombes, France
[32] Priority Mar. 4, 1968
[33] France
[31] 142,327

[54] FABRIC-REINFORCED TIRES
  4 Claims, 3 Drawing Figs.
[52] U.S. Cl. .................................................. 152/361,
  152/209
[51] Int. Cl. ........................................................ B60c 9/20
[50] Field of Search ............................................. 152/361,
  209, 354, 356

[56] References Cited
UNITED STATES PATENTS
2,274,855   3/1942   Wallace........................ 152/209
3,062,696   11/1962  Riehl........................... 152/209

Primary Examiner—James B. Marbert
Attorney—Holcombe, Wetherill & Brisebois

ABSTRACT: This invention relates to tires of the kind which have reinforcing fabric layers distributed within the tread thereof, one or more of such layers being undulated transversely and extending into the ribs of the tread pattern. In order to prevent any reinforcing fabric layer appearing in the bases of the grooves between the ribs of the tire pattern, the invention proposes applying a rubbery mixture having a weak flow characteristic, at least into the bases of the grooves between the ribs of the tire but, alternatively, over the whole tread pattern and into the grooves, thus parts of the applied mixture on the superficial areas of the tread rapidly wearing away to leave the mixture deep in the said grooves.

FABRIC-REINFORCED TIRES

The present invention relates to tires of the type which have reinforcing fabric layers distributed within their tread. This construction is used for tires intended for fitting to fast vehicles and particularly airplanes that take off and land at high speeds.

Figure 1:
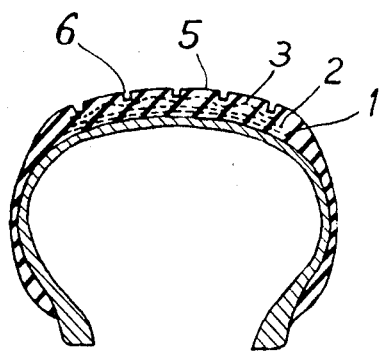

The FIG. 1 of the accompanying drawings shows a known tire of this kind, in which fabric layers 1, 2 and 3, distinct from those of the carcass 4, are primarily intended to increase the resistance to distortions of the tread 5 and to prevent it being stripped off at high speeds.

When a tire of this kind has outer ribs on the tread, it is advantageous to arrange them so that at least the fabric layer 3 which is nearest to the surface of the tread 5 penetrates into the ribs by being transversely undulated during molding. This may be ensured by placing the fabric layer 3 quite close to the surface of the tread at the time of construction so that the ribs on the mold that are provided to form grooves 6 of the tire, push the fabric layer 3 back locally so that it takes a transversely undulated shape. However, it happens that, during the molding, the fabric 3 becomes taut transversely between the ribs of the mold and remains in contact with the ridges of these ribs. After withdrawing the tire from the mold, the cords forming the fabric layer 3 can be seen in the base of the grooves of the tire. These cords have the tendency to become separated from the rubber of the tread and thus create the beginning of cuts in the base of the grooves. The ribs of the tire thus become more sensitive to stripping off, which is caused by the slots left by the threads or cables.

It is an object of the invention to avoid or minimize this drawback. To this end, at least the bases of the grooves of the tread are provided with a layer of rubber mixture which resists flaw at the molding temperature of the tire.

In general, a suitable rubbery mixture is a mixture with a high proportion of carbon black, i.e. 70 percent to 110 percent so that it has, once it has been vulcanized, quite a good hardness with respect to that of the mixtures usually used for the body of the tread. However, the same effect can be obtained by positioning a layer of prevulcanized or partially vulcanized rubber or gum at this place. In this case, a rubbery mixture having an average hardness on vulcanization may be used.

I am aware that it has already been proposed to produce tires having a surface coating of a rubbery mixture on the tread and taking the exact shape of the tread pattern, and consequently penetrating the ribs of the tire. Such a tire has been described for example in French Pat. 1,128,547 filed on 9th Apr. 1955 in the name of B. F. Goodrich Company. The object of this proposal was to prevent the formation and the spread of small cracks radiating from accidental cuts or above all from ageing and the action of ozone on the rubber of the tire. The coating was thus chosen for its resistance to ageing and it usually has a base of butyl. However, the drawback mentioned previously, mainly the appearance of the fabric in the base of the grooves of the new tires coming out from the mold, had not been observed at that time, so that the said prior proposal did not envisage the use of rubbery mixtures with a weak flow characteristic for these surface coatings, which the present invention proposes for the removal of the particular problems hereinabove referred to.

In order that the invention may be more clearly understood, reference will now be made to the accompanying drawings which show two embodiments of the invention by way of example, in comparison with a tire as previously made and in which:

FIG. 1 shows a section through the previously known tire, and

Figure 2:
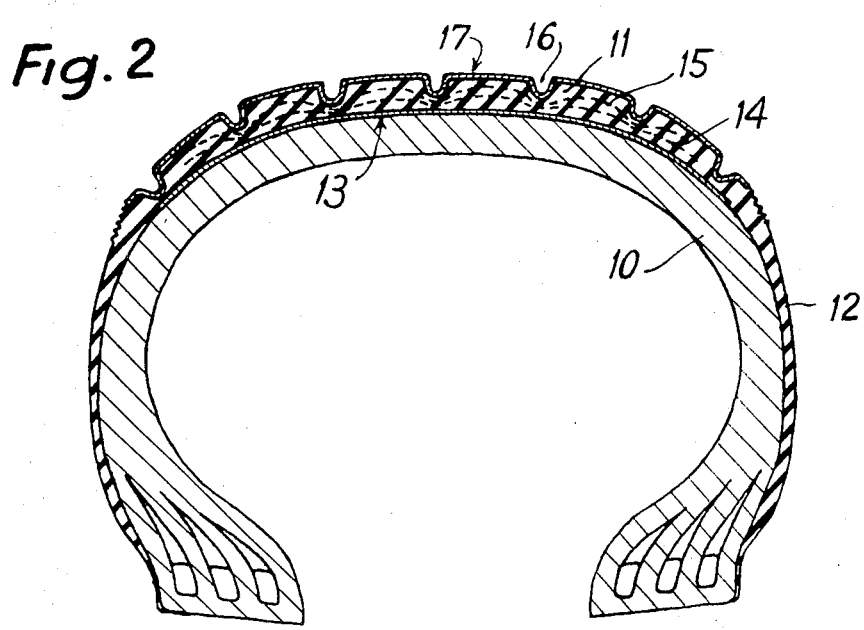
Figure 3:
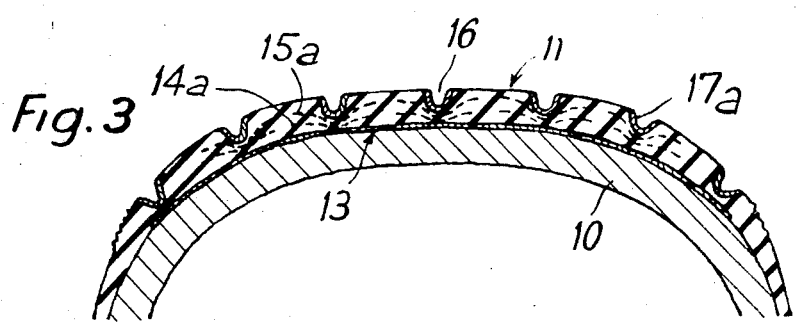

FIGS. 2 and 3 respectively show the two exemplary embodiments of the invention, also in cross section.

Referring to the drawings, the tire shown in FIG. 1 has already been described above.

In FIG. 2 the tire shown comprises a carcass 10 formed from one or more superimposed layers of cord material (material without a weft or with a light weft composed of parallel cords embedded in a thin layer of rubber), the number of these layers being dependent upon the dimension of the tire and the required strength. The carcass is coated externally with a layer of rubber or gum forming the tread 11, and the sidewalls 12 of the tire.

When making this tire, a breaker 13 is placed on the top of the carcass 10, and within the tread 11 are positioned reinforcing fabric layers 14 and 15 having the effect of reducing the elasticity of the tread in order to make this elasticity similar to that of the carcass 10 so as to avoid the large variation in elasticity between these two parts of the tire, after molding. During the molding, the fabric layers are pushed back by the ribs of the mold forming the outer grooves 16 of the tread so that they take the transversely undulated form seen in FIG. 2 which brings about an efficient reinforcement of the ribs of the tread.

A layer 17 of a rubbery mixture which resists flow at the molding temperature is also placed on the top of the tread 11. During the molding, this layer 17 takes the exact form of the surface of the tread and adheres strongly to this surface and penetrates the grooves 16.

This layer 17 thus prevents the cords of the upper fabric layer 15 from being exposed in the base of the grooves. In order to obtain this effect, the layer 17 does not need to be thick. Good results have been obtained with a layer of 1 mm. thick.

When the tire is used, the part of the layer 17 situated on the top of the ribs disappear quite rapidly due to wear but the parts situated in the base of the grooves 16 remain in position until the tire is completely worn out and continues to act as a protection, as regards the threads or cables situated below the base of the grooves.

The tires illustrated in FIG. 3 has the same construction as that of FIG. 2, except that the layer 17 is replaced by several strips 17a placed within the grooves in order to form the base and the walls of the grooves after the molding of the tire. Reinforcing fabric layers have also been shown in this tire, formed of strips 14a and 15a sectioned around the periphery within the ribs of the tire. These strips 14a 15a prevent the penetration of the mold ribs into the tread during the molding so that the cords of this strip have a lesser tendency to become exposed at the base of the tread grooves. The effect of this construction adds to that obtained by the protective layer 17.

Any rubbery mixture can be used for the layer 17 or for the strips 17a, which has the suitable flow characteristic at the temperature of the molding.

There may alternatively be used, for example, a rubbery mixture having a base of natural rubber or butadiene styrene containing from 70 to 110 percent parts by weight of reinforcing carbon black with the usual accelerators and protective agents.

This mixture is calendered in the form of a thin sheet and eventually cut up in order to form the layer 17 or the strips 17a which are used in an unvulcanized state in the manufactured tire.

The sheet calendered in this way may also be prevulcanized or partially vulcanized before being applied to the tread of the unfinished tire. However, since it is known that prevulcanization diminishes the flow characteristic of the rubber during the molding, the compositions shown above may be modified by decreasing the carbon black content so as to depress the hardness of the vulcanized mixture.

I claim:

1. In a tire having a tread surface formed by circumferential ribs and grooves and comprising at least one reinforcing fabric layer disposed within the tread, said layer being undulated transversely and extending into the ribs, the improvement which consists in the presence of a thin coating layer of a rubbery mixture of high carbon black content which resists flow at the molding temperature of the tire and taking the shape tread pattern and penetrating into said grooves, thereby minimizing exposure of the cords of the reinforcing fabric layer of the tread in the bases of the said grooves.

2. A tire according to claim 1 wherein the rubbery mixture has a base of rubber containing from 70 to 110 percent of carbon black.

3. A tire according to claim 2, wherein said rubbery mixture has previously been at least partially vulcanized.

4. A tire according to claim 2, wherein said reinforcing fabric layers are interrupted in the transverse direction along circumferential section lines situated within said ribs of the tire.